United States Patent

[11] 3,549,948

| [72] | Inventor | Ralph L. Jaeschke |
| | | Kenosha, Wis. |
| [21] | Appl. No. | 694,954 |
| [22] | Filed | Jan. 2, 1968 |
| [45] | Patented | Dec. 22, 1970 |

[54] PRESS SYNCHRONIZING APPARATUS
6 Claims, 2 Drawing Figs.

[52] U.S. Cl. ................................................... 317/6,
318/72, 318/85; 340/268
[51] Int. Cl. ..................................................... H02p 5/52
[50] Field of Search ........................................... 317/5, 6;
340/268; 324/69, 70CG, 161; 318/85, 72

[56] References Cited
UNITED STATES PATENTS

| 3,408,549 | 10/1968 | Shimabukuro | 318/85 |
| 3,026,452 | 3/1962 | Frankenfield et al. | 317/6 |
| 3,089,061 | 5/1963 | Nieuweboer | 324/70X |
| 3,092,756 | 6/1963 | Smith | 318/85X |

Primary Examiner—James D. Trammell
Assistant Examiner—William J. Smith
Attorney—Koenig, Senniger, Powers and Leavitt ABSTRACT: Apparatus is disclosed for operating a plurality of presses in synchronism. The crankshafts of the presses are driven through respective eddy-current couplings each of which includes both an eddy-current clutch and an eddy current brake. Thus, a variable torque in either direction can be applied to each crankshaft by appropriately varying the energization levels of the clutch and brake. The apparatus includes a source for providing a reference signal having an amplitude which, at each instant, represents a preselected speed for the presses. A tachometer is coupled to each press for generating a feedback signal the amplitude of which varies as a function of the actual instantaneous speed of the respective press. One of the presses acts as a master for controlling the other or slave presses. The torque applied to the crankshaft of the master press is varied as a function of the relative amplitudes of the reference signal and the respective feedback signal so that the master press is operated substantially at the speed represented by the reference signal. Respective selsyns are driven by each of the presses, including the master press, and the signal obtained from each selsyn driven by one of the slave presses is compared with that provided by the selsyn on the master press to generate a phase error signal for each slave press having an amplitude which varies as a function of the instantaneous angular displacement between the respective slave press crankshaft and the crankshaft of the master press. The torque applied to the crankshaft of each of the slave presses is then varied as a function of the algebraic sum of the common reference signal and the respective feedback and phase error signals thereby to operate each of the slave presses in synchronism with the master press.

PRESS SYNCHRONIZING APPARATUS

BACKGROUND OF THE INVENTION

This invention relates to apparatus for operating a plurality of presses in synchronism and more particularly to apparatus for controlling presses of the type in which the torque applied to each press crankshaft is variable by means of an eddy-current coupling.

When it is necessary to perform a series of press operations on a given workpiece and the workpiece is to be transferred from one press to another by automatic handling machinery, it is typically necessary to operate a plurality of presses in precise synchronism. It has previously been proposed to maintain a plurality of so-called slave presses in synchronism with a master press by varying the torque applied to the crankshaft of each of the slave presses as a function of the angular displacement or phase error between the instantaneous position of the slave press crankshaft and the position of the crankshaft of the master press. In such systems, however, no driving torque is applied to any one of the slave presses until there is a finite error between its actual position and the desired position. Thus, during acceleration and deceleration there will necessarily be some lag in the response of the slave presses and the synchronization will thus be less than exact. Further, since the only force operating to restore synchronism is proportional to angular error and thus provides a springlike action, interaction between this springlike force and the inertia of the press can cause instability or hunting of the actual instantaneous angular position of the press crankshaft around the desired instantaneous position

SUMMARY OF THE INVENTION

Among the several objects of the present invention may be noted the provision of apparatus for operating a press to cause its crankshaft precisely and synchronously to follow a preselected rotation of a reference standard or master; the provision of such apparatus which provides highly stable operation of the press without hunting; the provision of such apparatus which is highly reliable; and the provision of such apparatus which is relatively simple and inexpensive. Other objects and features will be in part apparent and in part pointed out hereinafter.

Briefly, apparatus of this invention is operative to cause the crankshaft of a press synchronously to follow a preselected rotation of a rotatable reference standard or master. The apparatus includes means for providing a reference signal having an amplitude which at each instant represents or is proportional to a preselected angular velocity for the crankshaft. Tachometer means are driven by the press crankshaft to generate a feedback signal having an amplitude which varies as a function of the actual instantaneous speed of the crankshaft. Means, such as a system of selsyns, are provided for generating a phase error signal having an amplitude of which varies as a function of the instantaneous angular displacement between the press crankshaft and the angular position of the reference standard or master. A torque is then applied to the crankshaft of the press, which torque varies as a function of the algebraic sum of the reference, the feedback and the phase error signals. Accordingly, the press is operated in synchronism with the reference standard.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
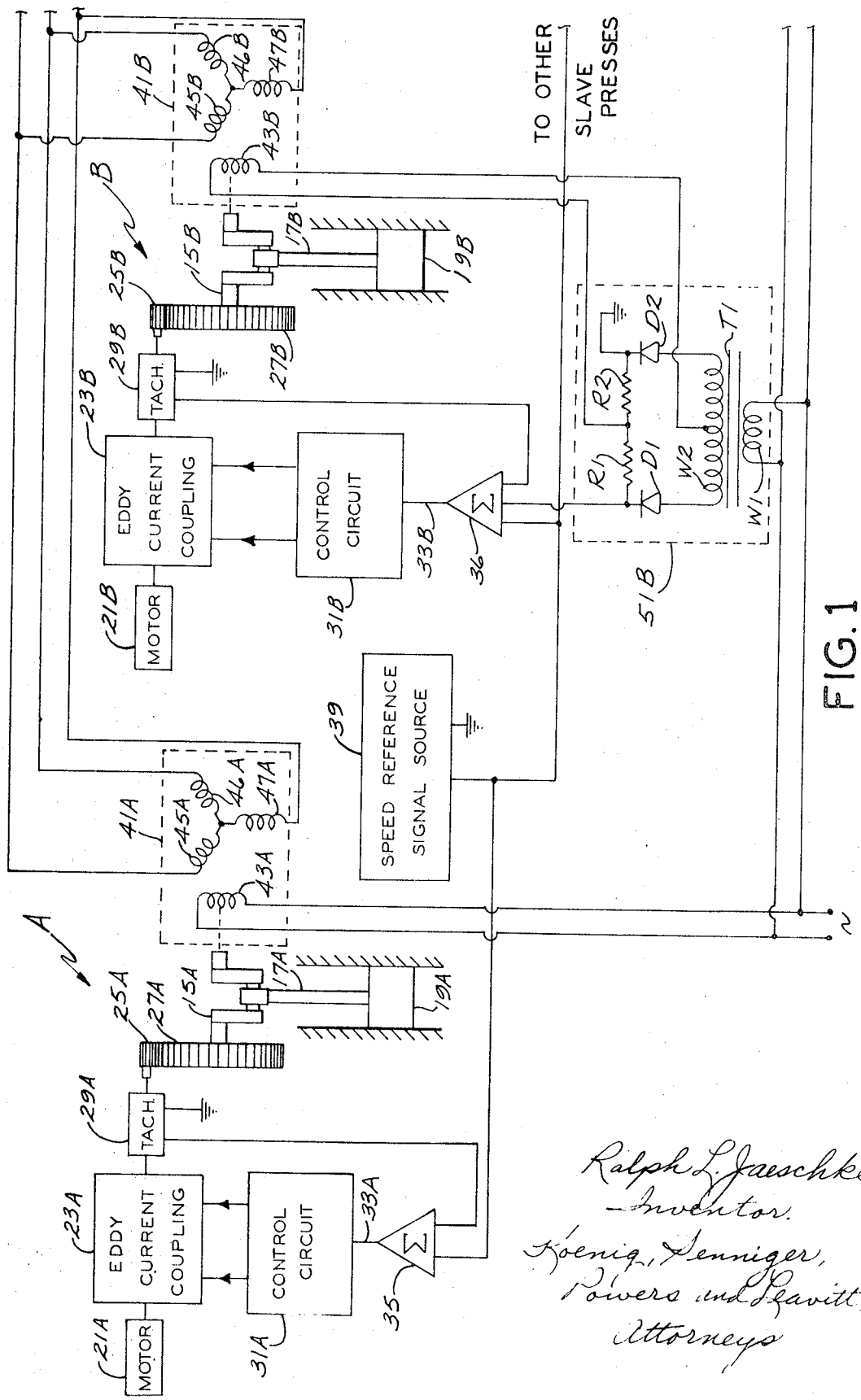
FIG. 1 is a diagrammatic illustration of a system including a plurality of presses which are operated in synchronism by apparatus of the present invention.

Referring now to FIG. 1, there are indicated at A and B a pair of presses each of which is provided with a variable speed drive. As is described in greater detail hereinafter, press A constitutes a so-called master press which is controlled independently of any other presses and press B is a so-called slave press which follows the movement of master press A. Only one slave press is shown but, as will be understood by those skilled in the art, additional slave presses similar to press B may also be controlled by press A. The elements which are the same in the two presses shown have been designated by corresponding reference characters plus respective letter postscripts to indicate with which press the particular element is associated.

Each press includes a crankshaft 15, a connecting rod 17 and a ram 19 arranged in conventional manner. Each press is driven by a respective motor 21 which is coupled to the respective crankshaft 15 through an eddy-current coupling 23 and a pair of reduction gears 25 and 27. A tachometer 29 is driven with the driving gear 25 to provide a feedback signal having an amplitude which is substantially proportional to and thus varies as a function of the actual instantaneous speed of the press.

Each of the eddy-current couplings 23 is preferably of the type described in copending application Ser. No. 654,158, filed Jul. 18, 1967 and entitled Press Speed Control, and includes both an eddy-current clutch and an eddy-current brake. As is disclosed in the aforesaid copending application, the torque applied to the crankshaft of a press through such a coupling may be varied by varying the relative levels of energization of the clutch and brake. The application discloses specific circuitry for varying the torque applied to a press crankshaft in response to a controlling voltage signal or plurality of signals. Respective controlling circuits of this type are indicated at 31 in the present drawing. Each of the circuits 31 operates to control the torque applied to the crankshaft of the respective press A or B as a function of the amplitude of a respective voltage input signal provided at a lead 33.

The torque controlling signals at leads 33A and 33B are provided by respective summing amplifiers 35 and 36. Each of these amplifiers provides an output signal which varies as a function of the algebraic sum of the input signals applied thereto. Summing amplifiers 35 and 36 are preferably of the differential input type so that input signals of opposite polarities can be accommodated and/or netted against one another in known manner depending on the function to be performed by each signal.

At 39 is indicated a speed reference signal source which is common to all of the presses. Source 39 provides a reference signal voltage having an amplitude which, at each instant, represents a preselected speed for the presses, that is, a preselected angular velocity for the crankshafts 15. Depending upon the particular application, this reference signal may be either a constant DC voltage or may vary within each cycle of press operation to provide a so-called programming of the press speed within each cycle. Apparatus for providing such programming is also disclosed in greater detail in the aforesaid copending application.

The common speed reference signal provided by source 39 and the feedback signal provided by the respective tachometer 29 are applied to the respective summing amplifier 35 or 36 associated with each press. Assuming for the moment that only these signals are applied to each summing amplifier, the torque control signal provided for each press at the respective lead 33 will then be simply a speed error signal which varies as a function of the relative amplitudes of the tachometer feedback signal and the speed reference signal. Thus, as is explained in greater detail in the aforementioned copending application, the torque applied to the crankshaft of each press is varied under tachometer feedback control to maintain the speed of the press quite precisely at the desired level represented by the speed reference signal.

As the speeds of both of the presses A and B are controlled in response to the single speed reference signal provided by source 39, it can be seen that the two presses will inherently tend to operate at the same speed. However, as will also be understood by those skilled in the art, there will always be slight differences between the two presses, their loads, or their control systems. Thus, over any extended period of operation, the presses would drift out of synchronism if only tachometer speed control were provided, that is, there would be a varying angular displacement between the respective crankshafts. To prevent gradual accumulation of this angular crankshaft displacement or phase error, the torque applied to the crankshafts of each of the slave presses is varied also as a function of the phase error or angular displacement between the respective slave press crankshaft and the crankshaft of the master press.

A selsyn 41 is driven by each of the presses. Each selsyn includes a wound rotor 43 which is mechanically coupled to the crankshaft 15 of the respective press so as to rotate therewith and includes also a stator having three windings 45—47. The rotor 43A which is driven by the master press A is energized with alternating current of fixed voltage and frequency. The three stator windings 45—47 of the different selsyns are connected together in conventional manner, as illustrated, so that the voltages induced in the stator windings 45A—47A of the master press selsyn are impressed across the corresponding stator windings 45B—47B of the slave press selsyn. As is understood by those skilled in the art, there will thus be induced in the rotor winding 43B of the slave press selsyn an AC voltage having an amplitude and instantaneous polarity which depends upon the relative angular positions of the master and slave crankshafts.

The voltage induced in the rotor of each slave press selsyn is compared with the AC voltage applied to the rotor of the master press selsyn in a respective discriminator circuit 51. The discriminator circuit 51 is conventional and includes a transformer T1 having a primary winding W1. Winding W1 is energized with the same AC supply voltage which is applied to the master press selsyn rotor 43A. The transformer T1 also includes a center-tapped secondary winding W2 which applies out-of-phase voltages to the anodes of a pair of diodes D1 and D2. A voltage divider comprising a pair of resistors R1 and R2 is connected across the cathodes of diodes D1 and D2. The AC voltage induced in the respective selsyn rotor is applied between the center tap of winding W2 and a junction between resistors R1 and R2. As is understood by those skilled in the art, the discriminator circuit 51 is operative to provide across the voltage divider comprising resistors R1 and R2 a phase error signal having an amplitude which varies as a function of the angular displacement between the slave press selsyn rotor 43B and the master press selsyn rotor 43A. One side of the voltage divider is grounded and the signal provided at the other end is applied to the respective slave press summing amplifier 36.

As noted previously, the summing amplifier 36 is operative to provide an output signal which varies as a function of an algebraic sum of the input signals applied thereto. Thus, the signal provided at lead 33B which controls the torque applied to the crankshaft of the slave press B will vary as a function of the algebraic sum of the common speed reference signal, the respective tachometer speed feedback signal and the respective phase error signal which is derived from the selsyns 41A and 41B and the discriminator 51B. The phase error signal is applied in a sense or polarity such that the torque variations caused thereby tend to correct any deviation in the instantaneous angular position of the slave press crankshaft relative to that of the master press. Since, as noted previously, the speed control applied to each of the presses in response to the relative amplitudes of the speed reference signal and the respective tachometer feedback signals tends to keep the two presses generally running together, the restoring force which must be applied by the selsyn-discriminator system to maintain exact synchronism will not be very large. Being relatively small, this restoring force introduces virtually no instability into the system. Thus, in one sense, most of the work in keeping each slave press in synchronism with the master press is accomplished by the speed control. The phase error control provided by the selsyn system exercises only a vernier correction to prevent a drifting apart of the angular positions of the crankshafts and to thereby maintain exact synchronization. Thus, high precision and a high level of stability are obtained in the same system.

While, in the embodiment illustrated, one or more slave presses are operated in synchronism with a master press whose crankshaft functions as a reference standard against which the angular positions of the slave crankshafts are compared, it should be understood that the slave presses may, in the same way, be caused to follow an arbitrarily selected rotatable reference standard which then functions as a guiding master even though it performs no press operations itself. The reference standard may, for example, be controlled by work handling or transfer machinery with which the presses are to be synchronized. Thus, in certain applications it may be desired to drive the rotor of a master selsyn by an independently controlled motor which is not associated with any press or to otherwise electrically synthesize a rotatable reference standard. Accordingly, the term rotation should be understood to encompass electrical rotation, e.g., by means of phase shifting, as well as mechanical rotation. Also, while the crankshafts of the presses are maintained at the same angular position in the embodiment shown, it should be understood that the crankshafts may be maintained at relative positions which are angularly or phase displaced from one another and that the presses will still operate in synchronism in that the relative positions of the crankshafts will not shift substantially as the presses rotate.

Figure 2:
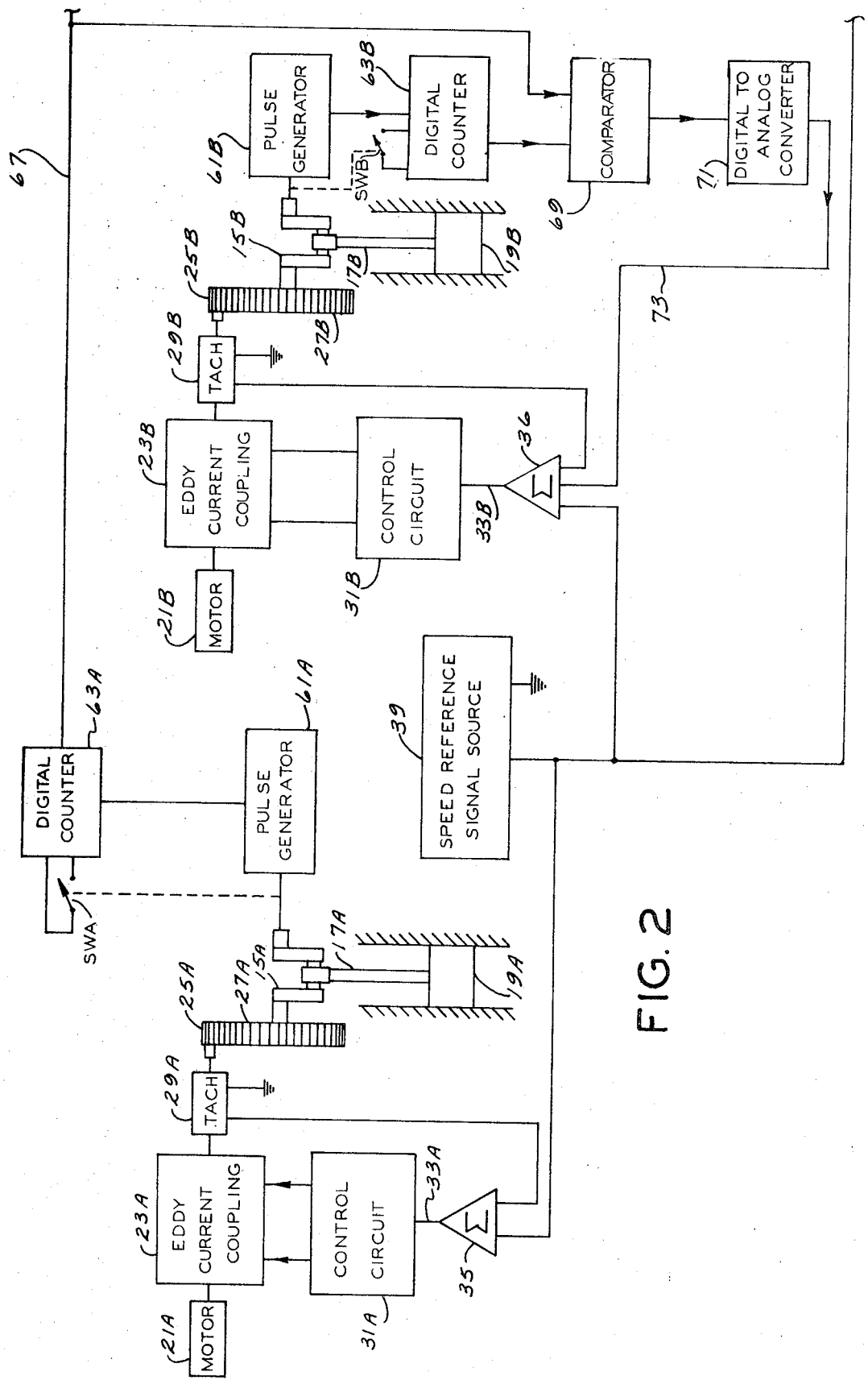
FIG. 2 is an alternative embodiment employing digital circuitry for providing a phase error signal.

Instead of deriving the phase error signal by analogue means as illustrated in FIG. 1, the phase error signal may be provided by digital circuitry as illustrated in FIG. 2. In this latter embodiment, each of the presses drives a pulse generator, 61A and 61B respectively. Each of the pulse generators is operative to produce a predetermined number of pulses for each revolution of the respective crankshaft and the pulses are applied to respective digital counters 63A and 63B. Each of the crankshafts operates a respective switch SWA and SWB, e.g., by means of a cam (not shown), for resetting the respective counter to zero once within each revolution. As will be understood by those skilled in the art, the count accumulated on each counter at any given instant thus provides an accurate indication of the angular position of the respective crankshaft at that time. The counter 63A associated with the master press A functions as a master positional reference and the count accumulated thereby is provided to each of the slave presses through a lead 67.

The count accumulated on the counter 63B of the slave press B is compared with the count accumulated on the master press counter 63A in a comparator circuit 69. Comparator circuit 69 operates to digitally subtract the two count values to obtain a difference value. The comparator circuit 69 drives a digital-to-analogue converter 71 which in turn provides, at a lead 73, a voltage signal having an amplitude and polarity corresponding to the magnitude and sign respectively of the difference value computed by the comparator circuit 69. As is understood by those skilled in the art, the digital difference value varies as a function of the angular displacement of the slave press crankshaft 15B from its desired position as represented by the count accumulated by the master press crankshaft 63A and thus the voltage signal provided by the digital-to-analogue converter 71 constitutes an analogue phase error signal similar to that provided by the descriminator 51B in the embodiment of FIG. 1. This phase error signal provided by converter 71 is applied to the summing circuit 36 in a sense which produces, in the eddy-current coupling 23B, a torque component which tends to correct the positional or phase error of the crankshaft 15B.

As in the embodiment of FIG. 1, the FIG. 2 system employs feedback speed control to maintain the speed of the slave press substantially equal to that of the master press and thus the positional or phase error signal applies only a vernier corrective action to maintain exact synchronization. Accordingly, a very stable response is obtained.

In view of the above it will be seen that the several objects of the invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for operating a plurality of presses in synchronism, each of said presses having a rotatable crankshaft by means of which the press is driven, said apparatus comprising:
    means for providing a reference signal having an amplitude which at each instant represents a preselected angular velocity for said press shafts;
    respective tachometer means coupled to each press for generating a respective feedback signal having an amplitude which varies as a function of the instantaneous speed of the respective crankshaft;
    means for applying to the crankshaft of one of said presses a torque which varies as a function of the relative amplitudes of said reference signal and the respective feedback signal thereby to operate said one press at each instant substantially at the speed represented by the instantaneous amplitude of said reference signal;
    means for generating for each press other than said one press a phase error signal having an amplitude which varies as a function of the instantaneous angular displacement between the respective crankshaft and the crankshaft of said one press; and
    means for applying to the crankshaft of each of said other presses a torque which varies as a function of the algebraic sum of said reference signal and the respective feedback and phase error signals whereby each of said other presses is operated in synchronism with said one press.

2. Apparatus as set forth in claim 1 wherein said means for generating said phase error signals comprises:
    a selsyn for each of said presses, each of said selsyns including a rotor having a winding and a stator having a plurality of windings, corresponding stator windings being interconnected with each other, the rotor of each selsyn being driven by the crankshaft of the respective press;
    means for applying an AC voltage to the winding of the rotor driven by the crankshaft of said one press; and
    respective discriminator means responsive to the voltage induced in the rotor winding of each selsyn driven by one of said other presses and to said AC voltage for generating a respective voltage having an amplitude which varies as a function of the relative angular positions of the rotor of the respective selsyn and the rotor of the selsyn driven by said one press.

3. Apparatus as set forth in claim 1 wherein said means for generating said phase error signals comprises:
    a pulse generator driven by each of said presses, each of said generators providing a plurality of pulses for each revolution of the respective crankshaft;
    a counter for each press for counting the pulses provided by the respective pulse generator;
    means for resetting each of said counters when the respective press crankshaft reaches a predetermined angular position; and
    comparator means for providing a phase error signal which varies as a function of the difference between the counts accumulated by said counters.

4. Apparatus for operating a press having a rotatable crankshaft by means of which the press is driven to cause said crankshaft synchronously to follow a preselected rotation of a rotatable reference standard, said apparatus comprising:
    means for providing a reference signal having an amplitude which at each instant represents a preselected angular velocity for said crankshaft which is independent of the angular velocity of said reference standard;
    tachometer means driven by said crankshaft for generating a feedback signal having an amplitude which varies as a function of the instantaneous speed of said crankshaft;
    means for generating a phase error signal having an amplitude which varies as a function of the instantaneous angular displacement between said crankshaft and the angular position of said reference standard, said phase error signal generating means including first counter means driven by said reference standard and second counter means driven by said crankshaft and including also comparator means for generating a phase error signal which varies as a function of the difference between the counts accumulated by the two said counter means; and
    means for applying to said crankshaft a torque which varies as a function of the algebraic sum of said reference and said feedback and said phase error signals whereby said press is operated in synchronism with said reference standard.

5. Apparatus as set forth in claim 4 wherein each of said counter means includes a pulse generator and a digital counter for counting the pulses generated by the respective pulse generator.

6. Apparatus as set forth in claim 4 wherein said comparator means comprises means for digitally subtracting the counts accumulated by said counter means and a digital-to-analogue converter for providing a signal having an amplitude which varies as a function of the difference between said counts.

PO-1050
(5/69)

UNITED STATES PATENT OFFICE
CERTIFICATE OF CORRECTION

Patent No. 3,549,948     Dated December 22, 1970

Inventor(s) Ralph L. Jaeschke

It is certified that error appears in the above-identified patent and that said Letters Patent are hereby corrected as shown below:

The assignment information has been omitted from the title page. Below "Patented Dec. 22, 1970" should be
--Assignee - Eaton Yale & Towne Inc., Cleveland, Ohio, a corporation of Ohio--.

Signed and sealed this 30th day of March 1971.

(SEAL)
Attest:

EDWARD M. FLETCHER, JR.
Attesting Officer

WILLIAM E. SCHUYLER, JR.
Commissioner of Patents